United States Patent
Concialdi

(10) Patent No.: US 6,298,828 B1
(45) Date of Patent: Oct. 9, 2001

(54) ADJUSTABLE FUEL PRESSURE REGULATOR

(75) Inventor: John P. Concialdi, Redondo Beach, CA (US)

(73) Assignee: Advanced Engine Management, Inc., Hawthorne, CA (US)

( * ) Notice: Subject to any disclaimer, the term of this patent is extended or adjusted under 35 U.S.C. 154(b) by 0 days.

(21) Appl. No.: 09/691,156

(22) Filed: Oct. 19, 2000

(51) Int. Cl.$^7$ .................................................. F02M 37/04
(52) U.S. Cl. ........................... 123/457; 123/463; 137/271
(58) Field of Search .................... 123/457, 514, 123/463, 464; 137/271, 510

(56) References Cited

U.S. PATENT DOCUMENTS

| | | |
|---|---|---|
| 4,300,510 | 11/1981 | Ishida et al. . |
| 4,592,385 | 6/1986 | Semon . |
| 4,883,088 | 11/1989 | Herbst . |
| 5,076,320 | 12/1991 | Robinson . |
| 5,101,793 * | 4/1992 | Sample ................................. 123/463 |
| 5,211,205 * | 5/1993 | Grant et al. .......................... 123/457 |
| 5,265,644 | 11/1993 | Tuckey . |
| 5,381,816 | 1/1995 | Alsobrooks et al. . |
| 5,409,035 | 4/1995 | Scott et al. . |
| 5,579,739 | 12/1996 | Tuckey et al. . |
| 5,785,023 * | 7/1998 | Cross ................................... 123/463 |
| 6,056,009 | 5/2000 | Powell et al. . |

* cited by examiner

Primary Examiner—Thomas N. Moulis
(74) Attorney, Agent, or Firm—Liniak, Berenato, Longacre & White

(57) ABSTRACT

A tunable fuel pressure regulator is disclosed. The regulator includes an internally replaceable fuel return orifice element that enables, in combination with the vacuum chamber adjustment screw, a wide range of fuel pressures and volumes to be accommodated within a single pressure regulator housing.

5 Claims, 3 Drawing Sheets

Fig. 2
Fig. 4
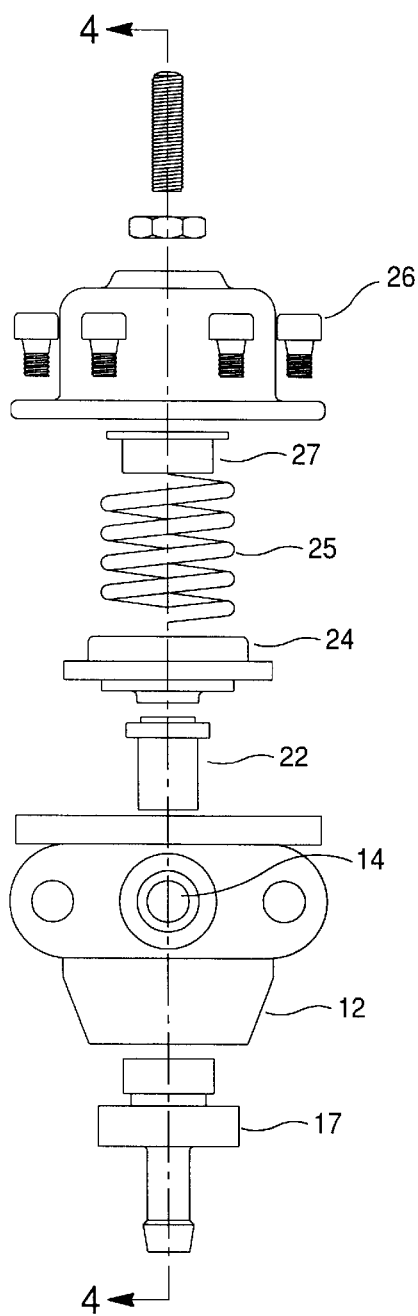
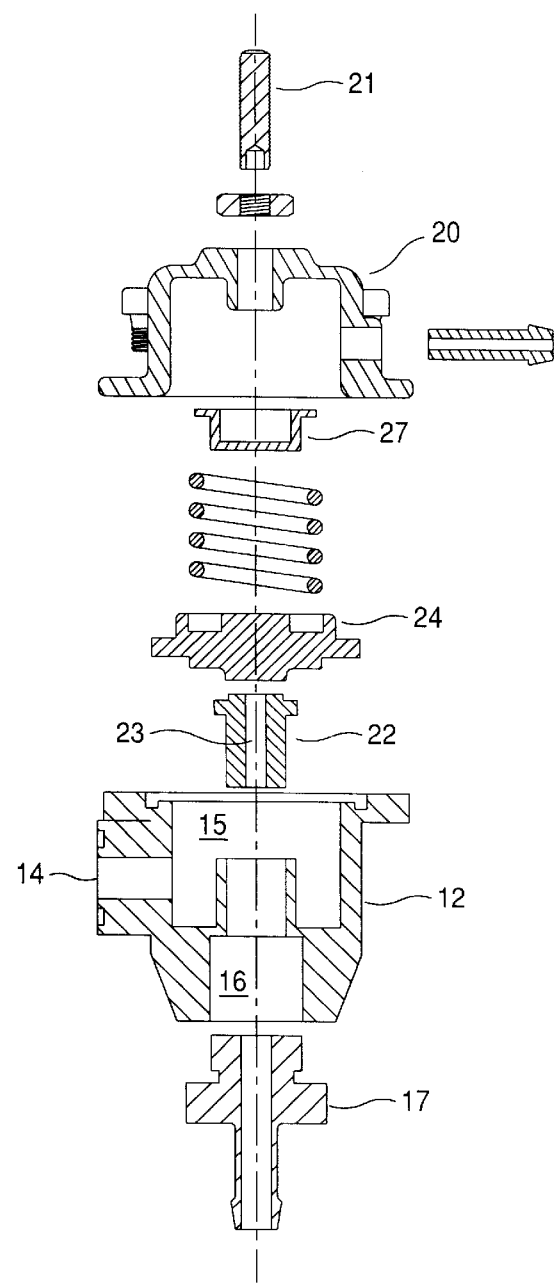

ADJUSTABLE FUEL PRESSURE REGULATOR

FIELD OF THE INVENTION

The present invention relates to the field of fuel injected automobile I.C. engines that are modified to obtain enhanced power characteristics. More specifically, the present invention is an adjustable pressure regulator with changeable discharge ports adapted for fitment to the fuel rail of a fuel injection system to enable more precise fuel flow delivery and pressure regulation in the fuel rail.

BACKGROUND OF THE INVENTION

In the field of after market engine performance enhancement, it is often an object of the enhancement to increase power output of the engine. To increase the power output, an engine must either become more efficient or use more fuel/air mixture more quickly and convert the fuel/air mixture into useful power. Various methods of increasing the fuel/air mixture into an engine are available. These methods can involve reducing restrictions on the air as it directed into, or out of, (or a combination of both) the engine, or pressurizing the air in the intake passageway. Likewise, as more air is directed into the engine, more fuel is also necessary. Typically, to direct more fuel into the engine, the pressure of the fuel supply is increased along with the volume of delivery. There are many ways to accomplish this result. One of these methods is to increase the fuel pressure in the fuel rail (pipe) that feeds the fuel injectors.

Most production car electronic fuel injection systems operate at relatively high fuel pressures, typically in the 30 to 50 psi range. The object of the fuel pressure regulator in such a system is to maintain a specified fuel pressure across the fuel injector so its fuel flow characteristics remain constant for all operational parameters of the engine. A typical fuel pressure regulator has a vacuum reference ported to the top chamber of the regulator, which also contains a spring to counter act the vacuum in the chamber. The reason for the use of the vacuum reference is to maintain adequate fuel flow over a wide range of the I.C. engine intake manifold pressures. This is especially important on engines that utilize a forced induction (turbo or super charged) system regardless of type. When the throttle valve is opened, inlet manifold pressure increases. The rise in manifold pressure causes resistance to fuel flowing from the fuel injector. The reduced fuel flow can result in catastrophic engine failure due to an over lean condition.

On a naturally aspirated engine, the intake manifold pressure range can be from 20" Hg vacuum to 29.92" Hg pressure. On an engine with forced induction, the range is significantly higher. On an engine that uses forced induction, the boost pressure is actually transferred to the top chamber to act in assistance to the aforementioned spring to make the fuel pressure higher than the regulator could using spring compression alone.

To accommodate this tuning aspect of fuel flow management, various sizes of pressure regulators are available. Each of these after market fuel pressure regulators is designed to accommodate particular design parameters and include some adjustability in the form of an adjustment screw which varies compression on the biasing spring in the regulator vacuum chamber. In the situation where the fuel return system is sized to accommodate too large a flow of fuel, the tuning of the regulator with the adjustment screw becomes excessively sensitive and adjustment of fuel pressure is difficult. Conversely, if the fuel return system is sized too small, the fuel pressure remains high for an excessive amount of time and a rich mixture will result upon deceleration.

SUMMARY OF THE INVENTION

The present invention is designed to address the need for tuning of the fuel supply and return system in fuel injected I.C. engines as performance modifications are successively performed. The pressure regulator of the present invention includes several features that enhance its use and application in the precise adjustment of fuel requirements. The primary feature is a replaceable fuel return orifice element mounted within the regulator housing. In use, the fuel return orifice can be replaced and the regulator can be tuned accordingly within a set of parameters associated with a specified orifice size. Likewise other replacement sizes can be offered that greatly expand the useful range of application possibilities for the regulator. In addition to the foregoing, the vacuum chamber adjustment screw is used in combination with any of the replaceable return orifice fittings for further tuning with each orifice.

BRIEF DESCRIPTION OF THE DRAWINGS

FIG. 2 is an exploded side view of a pressure regulator according to the present invention.

FIG. 4 is an exploded sectional view of the pressure regulator according to the present invention shown in FIG. 2.

DETAILED DESCRIPTION OF THE PREFERRED EMBODIMENT

Figure 1:
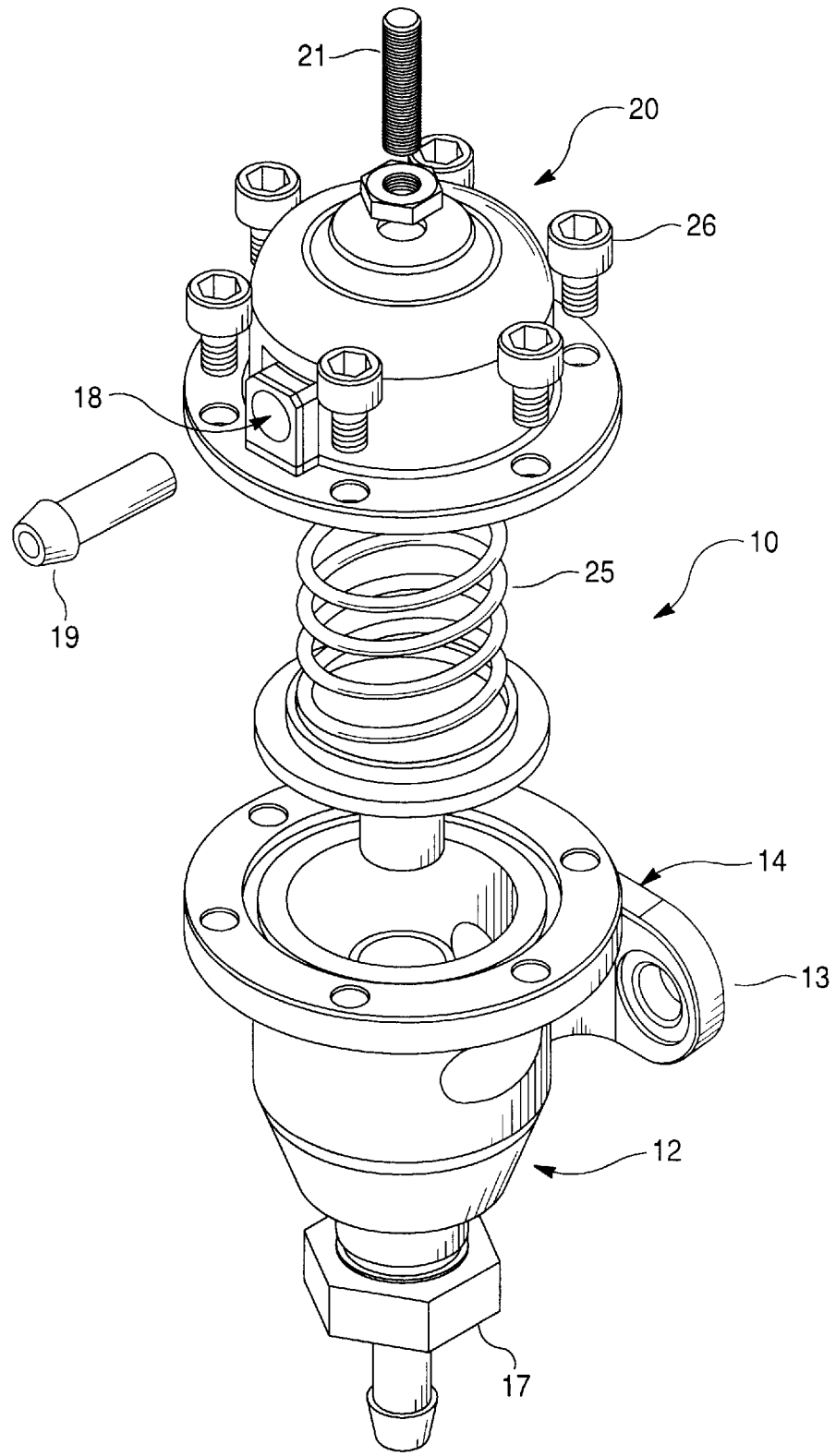
FIG. 1 is an exploded perspective view of a pressure regulator according to the present invention.
Figure 3:
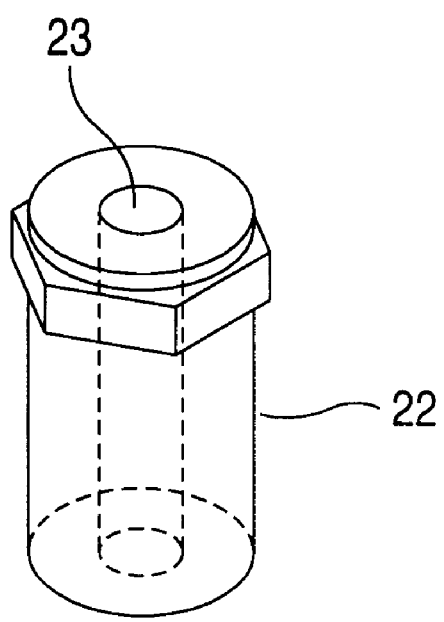
FIG. 3 is a replaceable return fuel orifice fitting for use in the pressure regulator shown in FIGS. 1 and 2.

FIGS. 1 and 2 show exploded views of a pressure regulator according to the present invention. The regulator 10 includes a main body portion 12 that includes a mounting area (ears 13) for attaching the regulator to a source of pressurized fuel coming from the fuel rail of the engine. Usually the regulator 10 is mounted directly to an end of the fuel rail attached to the intake manifold or cylinderhead of the engine. The regulator main body portion 12 defines a generally bowl shaped cavity 15 that has a fuel inlet passageway 14, positioned centrally with respect to the mounting ears 13, which is in fluid communication with the bowl shaped cavity. The cavity 15 also has a fuel return outlet 16 located at or near the bottom of the cavity through which fuel exiting the regulator passes into the return fuel line of the fuel system. The outlet 16 may have a suitable fitting 17 threaded into the bottom of the regulator. Alternatively, the outlet 16 may connect directly with the return fuel line of the vehicle fuel system.

The high-pressure fuel entering the regulator 10 from a fuel rail through inlet 14 passes to the outlet 16 through an internal fuel discharge orifice element 22. This discharge element 22 is placed into an upper portion of the outlet passageway 16 so that fuel exiting the regulator must pass through the orifice 23.

Fuel flow through the orifice 23 is controlled by movement of a diaphragm 24 associated with the upper body portion 20 of the regulator 10. The upper body portion of the regulator 10 is a vacuum chamber closed off, on the side facing the main body portion 12, by a flexible diaphragm 24. The movement of the diaphragm 24 is controlled by the source of vacuum, i.e., the control pressure provided by the intake manifold of the I.C. engine, connected to the vacuum port 18 and associated vacuum fitting 19. When the two body portions 12 and 20 of the regulator 10 are assembled together in a sealed manner (using attachment fasteners 26), the diaphragm 24 overlies and obscures fuel flow through the orifice 23 of the fitting 22. When little or no vacuum is applied to the chamber, i.e., during full throttle operation of the engine, the diaphragm is fully extended by an internal biasing spring 25 and essentially closes off fuel flow through the orifice 23. In this way, fuel pressure in the fuel rail, in fluid communication with the inlet 14, is maintained according to the high-pressure delivery of a fuel pump. When the throttle is closed, the vacuum in the intake manifold rises (creating a lower absolute pressure) and pulls the diaphragm away from its position closing off the orifice 23 and fuel is able to flow through the outlet 16 and to the fuel return system of the vehicle.

In tuning the regulator to appropriately return fuel and avoid supplying either too much or too little fuel during various engine operating conditions, the replaceable element 22 can be changed upon dis-assembly of the regulator 10 and separating the upper 20 and lower (main) 12 body portions. By replacing the element, the orifice 23 can be sized to accommodate the various engine operating conditions being experienced and return fuel flow and fuel rail pressure adjusted accordingly.

In addition, the diaphragm 24 response characteristics to varying vacuum loads can be adjusted by altering the position of the threaded adjustment screw 21 to vary the pre-load or bias of the internal spring 25 which pushes against the diaphragm 24 through platen 27. These adjustments, in combination with the replaceable element 22 and associated orifice 23, enable tuning of the fuel management system associated with an IC engine that has been modified to obtain different performance characteristics.

A preferred embodiment of the present regulator bolts directly to the end of a fuel rail for an I.C. engine. The regulator body portions and fitting are constructed of 6061 T-6 Aluminum. The outlet 16 is threaded with ⁹⁄₁₆–18 threads so that the return fuel line of several popular brands of vehicle may be directly connected thereto. The vacuum reference (control pressure) for the chamber 20 is 1:1 so that for every 1 pound of boost occurring within the intake manifold of the I.C. engine (in a pressurized intake engine) a corresponding 1 pound rise in fuel pressure also occurs. In this configuration, the regulator range of adjustability is 20 PSI to 150 PSI. By including a range of orifice 22 sizes of 0.100", 0.150", and 0.200", the regulator can be "tuned" to match the performance needs of many fuel pump/fuel injection system requirements.

Various other modifications and variations will occur to those skilled in the arts to which this invention pertains. Such variations, which generally rely on the teachings through which this disclosure has advanced the art, are properly considered to be within the scope of this invention. This disclosure is not to be considered as limiting except as noted in the following claims.

I claim:

1. A fluid pressure regulator, comprising:

a body portion having walls defining a first cavity, said first cavity having an open top, an inlet passageway, and an outlet passageway, said outlet passageway being fitted with an interiorly mounted replaceable element having a selected orifice size for limiting fluid flow through said outlet passageway; and, an upper body portion sealingly connected to said body portion and closing off said open top of said first cavity, said upper body portion itself defining a second cavity therein separate from said first cavity, said second cavity having a control pressure passageway connected thereto, and a portion of said cavity being closed by a flexible diaphragm element wherein a source of control pressure attached to said second cavity modulates said diaphragm to flex towards and away from an opposed inner surface of said upper body portion, said diaphragm overlying and modulating fluid flow into said orifice of said replaceable element according to control pressure actuation of said diaphragm.

2. A fluid pressure regulator as in claim 1, further comprising:

an exteriorly threaded fluid outlet fitting connected to an external portion of said fluid outlet passageway.

3. A fluid pressure regulator as in claim 1, further comprising:

an adjustment means accessible from an exterior surface of said upper body portion for adjusting the rate of response of said diaphragm to changes in said control pressure.

4. A fluid pressure regulator as in claim 3, further comprising:

a biasing means for biasing said diaphragm into a predetermined initial position to limit fuel flow through said orifice, and said adjustment means acting on said biasing means.

5. A fluid pressure regulator as in claim 1, wherein:

said selected orifice size of said replaceable element is in the range of from 0.1 to 0.2 inches.

* * * * *